(12) United States Patent
Pehlert et al.

(10) Patent No.: US 11,414,526 B2
(45) Date of Patent: Aug. 16, 2022

(54) HIGH MELT STRENGTH POLYPROPYLENE AND EXTRUSION PROCESS FOR PRESERVING MELT STRENGTH

(71) Applicants: EXXONMOBIL CHEMICAL PATENTS INC., Baytown, TX (US); BASF SE, Ludwigshafen (DE)

(72) Inventors: George J. Pehlert, Houston, TX (US); Mosha H. Zhao, Houston, TX (US); Roswell E. King, Pleasantville, NY (US)

(73) Assignee: EXXONMOBIL CHEMICAL PATENTS INC., Baytown, TX (US)

( * ) Notice: Subject to any disclaimer, the term of this patent is extended or adjusted under 35 U.S.C. 154(b) by 229 days.

(21) Appl. No.: 15/321,594

(22) PCT Filed: Jun. 25, 2015

(86) PCT No.: PCT/US2015/037616
§ 371 (c)(1),
(2) Date: Dec. 22, 2016

(87) PCT Pub. No.: WO2015/200586
PCT Pub. Date: Dec. 30, 2015

(65) Prior Publication Data
US 2017/0210859 A1 Jul. 27, 2017

Related U.S. Application Data

(60) Provisional application No. 62/016,722, filed on Jun. 25, 2014.

(51) Int. Cl.
| | | |
|---|---|---|
| *C08J 3/20* | (2006.01) | |
| *C08L 23/10* | (2006.01) | |
| *C08K 5/00* | (2006.01) | |
| *C08L 23/02* | (2006.01) | |
| *C08K 5/526* | (2006.01) | |
| *C08K 5/134* | (2006.01) | |
| *B29C 48/92* | (2019.01) | |
| *B29C 48/76* | (2019.01) | |
| *B29C 48/875* | (2019.01) | |
| *C08L 23/12* | (2006.01) | |
| *B29B 7/00* | (2006.01) | |
| *B29B 7/48* | (2006.01) | |
| *B29B 7/72* | (2006.01) | |
| *B29B 7/82* | (2006.01) | |
| *B29B 13/10* | (2006.01) | |
| *C08K 5/1545* | (2006.01) | |
| *C08K 5/52* | (2006.01) | |
| *B29C 48/69* | (2019.01) | |

(52) U.S. Cl.
CPC .............. *C08J 3/203* (2013.01); *B29B 7/002* (2013.01); *B29B 7/489* (2013.01); *B29B 7/726* (2013.01); *B29B 7/823* (2013.01); *B29B 13/10* (2013.01); *B29C 48/76* (2019.02); *B29C 48/875* (2019.02); *B29C 48/92* (2019.02); *C08K 5/005* (2013.01); *C08K 5/134* (2013.01); *C08K 5/1545* (2013.01); *C08K 5/52* (2013.01); *C08K 5/526* (2013.01); *C08L 23/02* (2013.01); *C08L 23/10* (2013.01); *C08L 23/12* (2013.01); *B29C 48/69* (2019.02); *B29C 2948/92704* (2019.02); *C08J 2323/12* (2013.01)

(58) Field of Classification Search
CPC ......... B29B 13/10; B29B 7/823; B29B 7/726; B29B 7/489; B29B 7/002; C08K 5/526; C08K 5/134; C08K 5/1545; C08K 5/52; C08K 5/005; C08L 23/10; C08L 23/02; C08L 23/12; B29C 47/76; B29C 47/827; B29C 47/92; B29C 2947/92704; B29C 47/68; B29C 47/807; B29C 48/92; B29C 48/76; B29C 48/875; B29C 48/69; B29C 2948/92704; C08J 3/203; C08J 2323/12
USPC .......................................................... 524/110
See application file for complete search history.

(56) References Cited

U.S. PATENT DOCUMENTS

| | | | | |
|---|---|---|---|---|
| 5,554,668 A | * | 9/1996 | Scheve | C08F 110/06 |
| | | | | 522/157 |
| 2010/0222470 A1 | | 9/2010 | Basfar et al. | |
| 2012/0043692 A1 | * | 2/2012 | Connor | C08K 5/5317 |
| | | | | 264/210.2 |

FOREIGN PATENT DOCUMENTS

| | | |
|---|---|---|
| EP | 1816158 | 8/2007 |
| JP | 2002069314 A | 3/2002 |
| JP | 2005538528 A | 12/2005 |
| JP | 2010500468 A | 1/2010 |

(Continued)

OTHER PUBLICATIONS

Maier, Clive; Calafut, Teresa. Polypropylene: The Definitive User's Guide and Databook. Elsevier Science, p. 14. (Year: 2008).*

(Continued)

*Primary Examiner* — Angela C Scott
(74) *Attorney, Agent, or Firm* — Lowenstein Sandler LLP

(57) ABSTRACT

A method of melt blending a polypropylene and the melt blended polypropylene therefrom, comprising providing a base-polypropylene having a MFR of less than 15 g/10 min and a molecular weight distribution (Mw/Mn) within the range from 5 to 16, and comprising hindered phenol and phosphorous-type antioxidants, and within the range from 5 ppm to 4000 ppm of an alkyl radical scavenger relative to the total weight of the components to form a melt blended polypropylene; melt blending the melt blended polypropylene at a temperature of at least 210° C.; and isolating a melt blended, melt blended polypropylene.

11 Claims, 2 Drawing Sheets

(56) References Cited

FOREIGN PATENT DOCUMENTS

| | | | |
|---|---|---|---|
| JP | 2010043162 | | 2/2010 |
| JP | 2014009345 A | * | 1/2014 |
| WO | 9749759 | | 12/1997 |
| WO | 9910424 | | 3/1999 |
| WO | 2004025670 A1 | | 3/2004 |
| WO | 2008002841 | | 1/2008 |
| WO | 2008020925 A1 | | 2/2008 |
| WO | 2009007265 | | 1/2009 |
| WO | 2011101091 | | 8/2011 |
| WO | 2013004804 | | 1/2013 |
| WO | 2014070384 | | 5/2014 |

OTHER PUBLICATIONS

Sabic PP 500P "PP homopolymer for Thermoforming", Sabic, Sep. 1, 2014, 2 pages.
European Patent Office, Communication pursuant to Article 94(3) EPC for application No. 15 745 604.7 dated Jan. 25, 2018, 6 pages.
Al-Malaika S., et al.: "The Antioxidant Role of Alpha-Tocopherol in Polymers II. Melt Stabilising Effect in Polypropylene", Polymer DeGradation and Stability, Barking, GB, vol. 64, No. 1, Apr. 1, 1999, pp. 145-156.
International Search Report and Written Opinion dated Sep. 21, 2015 for application No. PCT/US2015/037616, 11 pages.
English Translation of Office Action for JP Application No. 2016-575101, dated Jun. 24, 2019, 9 pages.

* cited by examiner

HIGH MELT STRENGTH POLYPROPYLENE AND EXTRUSION PROCESS FOR PRESERVING MELT STRENGTH

CROSS-REFERENCE TO RELATED APPLICATION

The present application is a national stage entry under 35 U.S.C. § 371 of International Application No. PCT/US2015/037616, filed on Jun. 25, 2015, which claims priority to U.S. Ser. No. 62/016,722, filed on Jun. 25, 2014, herein incorporated by reference.

FIELD OF THE INVENTION

The present invention relates to a melt blended polypropylene, and in particular to melt blended polypropylene combined with antioxidants and alkyl radical scavengers, and methods of melt blending the polypropylene.

BACKGROUND

The combined use of so called "primary" and "secondary" antioxidants in polyolefins and polyolefin compositions is well known. Common primary antioxidants include so called hindered phenols, and common secondary antioxidants include phosphorous compounds. While these compounds are useful in preventing, for example, UV-induced degradation of finished polyolefin pellets and articles, in certain situations, these antioxidants are not adequate to maintain Melt Strength during high melt temperature processing (e.g., above 450° F., or 232° C.). This is especially true when extruding high molecular weight (e.g., greater than 500,000 g/mole weight average molecular weight) polypropylene, and/or a polypropylene having a high molecular weight component (or "tail") where there is a particular desire to maintain the molecular weight and, hence, the Melt Strength. What is needed is a way to melt-extrude and pelletize such types of compositions that prevents the loss of the polymer's desirable properties.

Related publications include: Al-Malaika et al. "The antioxidant role of α-tocopherol in polymers II. Melt stabilising effect in polypropylene", in 64 POLY. DEGRADATION AND STABILITY 145-156 (1999); Beese et al. "Improving synthetic hindered phenol antioxidants: learning from vitamin E", in 70 POLY. DEGRADATION AND STABILITY 89-96 (2000); Al-Malaika et al. "The antioxidant role of vitamin E in polymers V. Separation of stereoisomers and characterisation of other oxidation products of dl-α-tocopherol formed in polyolefins during melt processing", in 73 POLY. DEGRADATION AND STABILITY 491-503 (2001); Stricker et al. "New Stabilizer solutions for polyolefin film grades", in European TAPPI PLACE Conference, Rome, Italy, May 12-14 (2003); J. J. Fay et al., "Stabilization of Polyolefins: an overview of antioxidant chemistry & effects" Baytown, Tex., presentation (Sep. 16, 2013); B. van Beusichem et al., "Introduction to Polymer Additives and Stabilization", Ciba Expert Services, Ciba Specialty Chemicals, poster (December 2005); EP 1 736 506 A1; EP 2 014 716 A1; EP 2 679 630 A1; U.S. Pat. No. 8,883,280; US 2005/0043450; US 2006/0128849; US 2013/0023598; US 2014/0308502; U.S. Pat. Nos. 7,772,346; 6,350,828; WO 2012/150019; and WO 98/55543.

SUMMARY

Disclosed herein is a method of melt blending a polypropylene composition, comprising providing (A) a base-polypropylene having a melt flow rate (ASTM D1238, condition L at 230° C. and 2.16 kg load) of less than 15 g/10 min and a molecular weight distribution (Mw/Mn) of at least 5, and (B) at least one hindered phenol antioxidant and at least one phosphorous-type antioxidant, and (C) within the range from 5 ppm to 4000 ppm of an alkyl radical scavenger relative to the total weight of the components; melt blending the base-polypropylene, antioxidants and alkyl radical scavenger in an extruder having a temperature controlled length from the feed zone to the die zone, wherein the initial melt temperature at the feed zone is less than 180° C., and the final melt temperature at the die zone of at least 210° C.; and isolating a melt blended polypropylene preferably having measured properties substantially the same as the base-polypropylene, and most preferably having a Melt Strength substantially the same as the base-polypropylene.

Also disclosed is a melt blended polypropylene comprising (A) a base-polypropylene having a MFR (230° C./2.16 kg) of less than 15 g/10 min and a molecular weight distribution (Mw/Mn) of at least 5, and (B) the reaction product of (i) at least one hindered phenol antioxidant, (ii) at least one phosphorous-type antioxidant, and (iii) within the range from 5 ppm to 4000 ppm of an alkyl radical scavenger, and (iv) an oxygenate, a carbon radical, or combinations thereof.

Also disclosed is a melt blended polypropylene comprising the reaction product of (A) a base-polypropylene having a MFR (230° C./2.16 kg) of less than 15 g/10 min and a molecular weight distribution (Mw/Mn) of at least 5, with (B) at least one hindered phenol antioxidant, (C) at least one phosphorous-type antioxidant, (D) within a range from 5 ppm to 4000 ppm of an alkyl radical scavenger, and (E) an oxygenate, a carbon radical, or combinations thereof.

DETAILED DESCRIPTION

Figure 1:
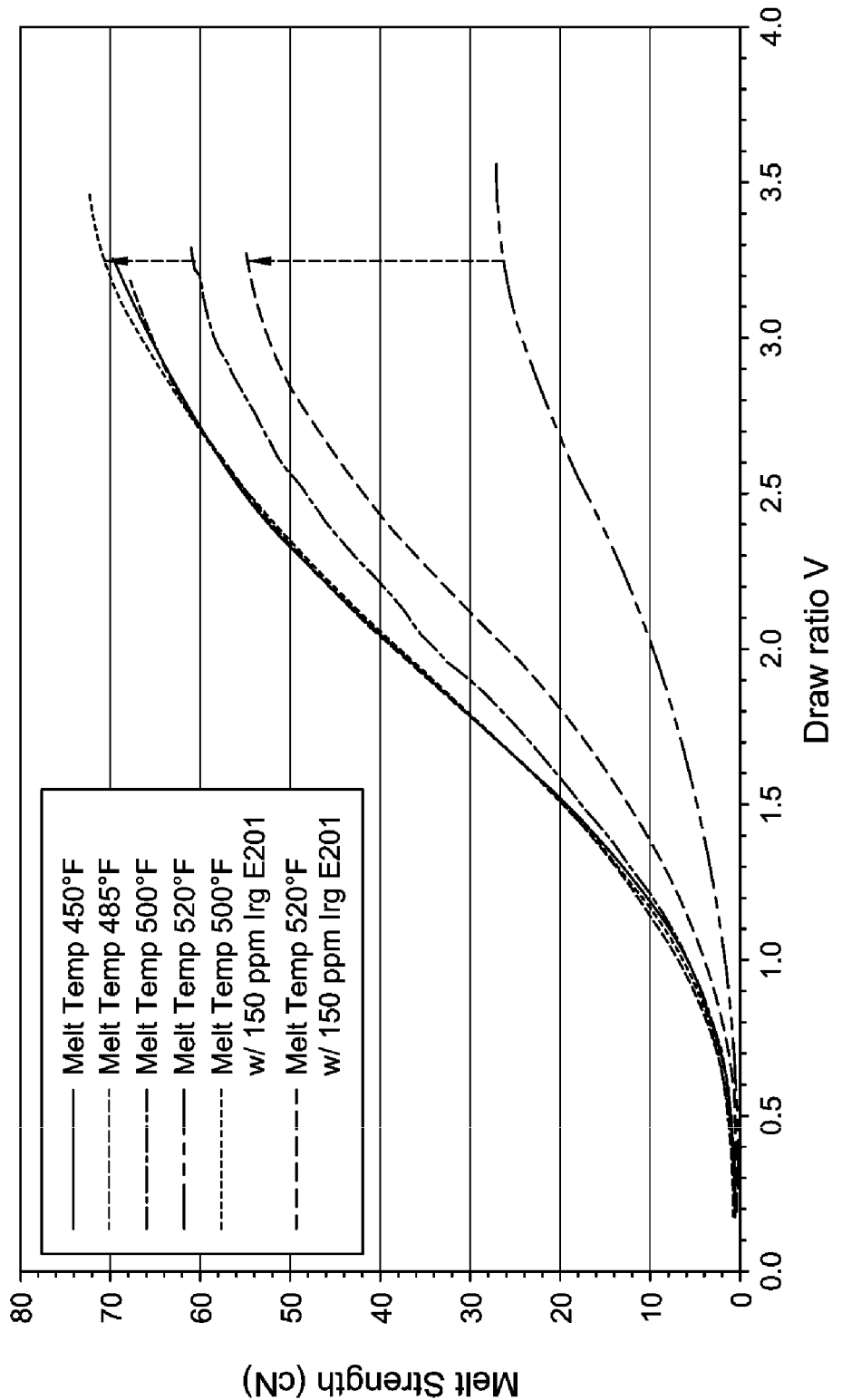
FIG. 1 is a graphical representation of the effects of temperature on the Melt Strength of polypropylenes in Table 2 as a function of draw ratio, where the arrows indicate an improvement in the Melt Strength at a given temperature upon inclusion of an alkyl radical scavenger with the base-polypropylene.

Disclosed herein is a method of melt blending a polypropylene composition in a way that preserves its Melt Strength, even at high temperatures used to process (e.g., melt blend) high molecular weight polyolefins such as at least 210° C. or higher. The method comprises providing a base-polypropylene having a melt flow rate (ASTM D1238, condition L at 230° C. and 2.16 kg load using a melt indexer) of less than 15 g/10 min and a molecular weight distribution (Mw/Mn) of at least 5, with at least one hindered phenol and at least one phosphorous-type antioxidant, and within the range from 5 ppm to 4000 ppm of an alkyl radical scavenger relative to the total weight of the components. The composition is then melt blended at a melt temperature of less than 180° C. at the beginning or feed zone stage of the extruder, but increases as the polymer makes its way through the extruder as described herein. Preferably, the inventive process is useful in forming pellets of a melt blended polypropylene, convenient for shipping, storage, and further processing as by injection molding, thermoforming, foaming, etc.

Desirably, the useful base-polypropylene has a Melt Strength of at least 15 cN, or within a range from 15 to 150 cN at 190° C. (or within ranges as described herein). In any embodiment when the base-polypropylene is melt blended at 210, 220, 240, or 260° C. or higher, the resulting melt blended polypropylene has measured properties that are substantially the same as those of the base-polypropylene.

Any means can be used to "melt blend" the components such as by single or twin screw extruders, batch blenders, and other blenders known in the art and suitable for forming a melt of the polymeric components and forming an intimate mixture of those components, including any antioxidant and/or alkyl radical scavenger that may or may not melt at the temperature of the polymer(s).

Base-Polypropylene

Here and throughout this specification, the term "base-polypropylene" refers to the polypropylene homopolymer or copolymer that is useful in the inventive process of melt blending, which results in a polymer referred to as a "melt blended polypropylene", though, most preferably, its Melt Strength, measured as described below, is the same or only slightly less than the Melt Strength of the base-polypropylene. The "base-polypropylene" that is most preferred in any embodiment of the invention has the properties described herein, and can be made by any means known to those of skill in the art, but most preferably is produced using a Ziegler-Natta succinate-containing catalyst. The properties referred to here are those of the reactor-grade material prior to melt blending. In any embodiment, the desirable base-polypropylene is a homopolymer of propylene-derived units, or is a propylene copolymer comprising within the range of from 0.20 or 0.40 or 0.80 wt % to 1.0 or 2.0 or 4.0 or 6.0 wt %, by weight of the base-polypropylene, of ethylene or $C_4$ to $C_{12}$ α-olefin derived units, most preferably ethylene, 1-butene or 1-hexene derived units, the remainder being propylene-derived units.

Ziegler-Natta catalysts suitable to produce the useful base-polypropylenes include solid titanium supported catalyst systems described in U.S. Pat. Nos. 4,990,479 and 5,159,021, and WO 00/63261, and others. Briefly, the Ziegler-Natta catalyst can be obtained by: (1) suspending a dialkoxy magnesium compound in an aromatic hydrocarbon that is liquid at ambient temperatures; (2) contacting the dialkoxy magnesium hydrocarbon composition with a titanium halide and with a diester of an aromatic dicarboxylic acid; and (3) contacting the resulting functionalized dialkoxy magnesium-hydrocarbon composition of step (2) with additional titanium halide.

The "catalyst system" typically includes a solid titanium catalyst component comprising titanium as well as magnesium, halogen, a non-aromatic "internal" electron donor, and at least one, preferably two or more "external" electron donors. The solid titanium catalyst component, also referred to as a Ziegler-Natta catalyst, can be prepared by contacting a magnesium compound, a titanium compound, and at least the internal electron donor. Examples of the titanium compound used in the preparation of the solid titanium catalyst component include tetravalent titanium compounds having the formula (I):

$$Ti(OR_n)X_{4-n} \quad (I)$$

wherein R is a hydrocarbyl radical, X is a halogen atom, and n is from 0 to 4.

The terms "hydrocarbyl radical," "hydrocarbyl" and "hydrocarbyl group" are used interchangeably throughout this document unless otherwise specified. For purposes of this disclosure, a hydrocarbyl radical is defined to be $C_1$ to $C_{20}$ radicals, or $C_1$ to $C_{10}$ radicals, or $C_6$ to $C_{20}$ radicals, or $C_7$ to $C_{20}$ radicals that may be linear, branched, or cyclic where appropriate (aromatic or non-aromatic); and includes hydrocarbyl radicals substituted with other hydrocarbyl radicals and/or one or more functional groups comprising elements from Groups 13-17 of the periodic table of the elements. In addition, two or more such hydrocarbyl radicals may together form a fused ring system, including partially or fully hydrogenated fused ring systems, which may include heterocyclic radicals.

Preferably, the halogen-containing titanium compound is a titanium tetrahalide, or titanium tetrachloride. The titanium compounds may be used singly or in combination with each other. The titanium compound may be diluted with a hydrocarbon compound or a halogenated hydrocarbon compound. Non-limiting examples include titanium tetra-halides such as $TiCl_4$, $TiBr_4$, and/or $TiI_4$; alkoxy titanium trihalides including $Ti(OCH_3)Cl_3$, $Ti(OC_2H_5)Cl_3$, $Ti(O\ n\text{-}C_4H_9)Cl_3$, $Ti(OC_2H_5)Br_3$, and/or $Ti(O\text{-iso-}C_4H_9)Br_3$; dialkoxytitanium dihalides including $Ti(OCH_3)_2Cl_2$, $Ti(OC_2H_5)_2Cl_2$, $Ti(O\text{-n-}C_4H_9)_2Cl_2$ and/or $Ti(OC_2H_5)_2Br_2$; trialkoxytitanium monohalides including $Ti(OCH_3)_3Cl$, $Ti(OC_2H_5)_3Cl$, $Ti(O\text{-n-}C_4H_9)_3Cl$ and/or $Ti(OC_2H_5)_3Br$; and/or tetraalkoxy titaniums including $Ti(OCH_3)_4$, $Ti(OC_2H_5)_4$, and/or $Ti(O\text{-n-}C_4H_9)_4$.

Preferably, the magnesium compound to be used in the preparation of the solid titanium catalyst component includes a magnesium compound having reducibility and/or a magnesium compound having no reducibility. Suitable magnesium compounds having reducibility may, for example, be magnesium compounds having a magnesium-carbon bond or a magnesium-hydrogen bond. Suitable examples of such reducible magnesium compounds include dimethyl magnesium, diethyl-magnesium, dipropyl magnesium, dibutyl magnesium, diamyl magnesium, dihexyl magnesium, didecyl magnesium, magnesium ethyl chloride, magnesium propyl chloride, magnesium butyl chloride, magnesium hexyl chloride, magnesium amyl chloride, butyl ethoxy magnesium, ethyl butyl magnesium, and/or butyl magnesium halides. These magnesium compounds may be used singly or they may form complexes with the organoaluminum co-catalyst as described herein. These magnesium compounds may be a liquid or a solid.

Suitable examples of the magnesium compounds having no reducibility include magnesium halides such as magnesium chloride, magnesium bromide, magnesium iodide, and magnesium fluoride; alkoxy magnesium halides, such as magnesium methoxy chloride, magnesium ethoxy chloride, magnesium isopropoxy chloride, magnesium phenoxy chloride, and magnesium methylphenoxy chloride; alkoxy magnesiums, such as ethoxy magnesium, isopropoxy magnesium, butoxy magnesium, n-octoxy magnesium, and 2-ethylhexoxy magnesium; aryloxy magnesiums such as phenoxy magnesium and dimethylphenoxy magnesium; and/or magnesium carboxylates, such as magnesium laurate and magnesium stearate.

Non-reducible magnesium compounds may be compounds derived from the magnesium compounds having reducibility, or may be compounds derived at the time of preparing the catalyst component. The magnesium compounds having no reducibility may be derived from the compounds having reducibility by, for example, contacting the magnesium compounds having reducibility with polysiloxane compounds, halogen-containing silane compounds, halogen-containing aluminum compounds, esters, alcohols, and the like.

The magnesium compounds having reducibility and/or the magnesium compounds having no reducibility may be complexes of the above magnesium compounds with other metals, or mixtures thereof with other metal compounds. They may also be mixtures of two or more types of the above compounds. Further, halogen-containing magnesium compounds, including magnesium chloride, alkoxy magnesium chlorides and aryloxy magnesium chlorides may be used.

Supported Ziegler-Natta catalysts may be used in combination with a co-catalyst, also referred to herein as a Ziegler-Natta co-catalyst. Compounds containing at least one aluminum-carbon bond in the molecule may be utilized as the co-catalysts, also referred to herein as an organoaluminum co-catalyst. Suitable organoaluminum compounds include organoaluminum compounds of the general formula (II):

$$R^1{}_m Al(OR^2{}_n)_n H_p X_q \quad (II)$$

wherein $R^1$ and $R^2$ are identical or different, and each represents a hydrocarbyl radical containing from 1 to 15 carbon atoms, or 1 to 4 carbon atoms; X represents a halogen atom; and m is 1, 2, or 3; n is 0, 1, or 2; p is 0, 1, 2, or 3; and q is 0, 1, or 2; and wherein m+n+p+q=3.

Other suitable organoaluminum compounds include complex alkylated compounds of metals of Group I (Periodic Table, lithium, etc.) and aluminum represented by the general formula (III):

$$M^1 Al R^1{}_4 \quad (III)$$

wherein $M^1$ is the Group I metal such as Li, Na, or K and $R^1$ is as defined in formula (II).

Suitable examples of the organoaluminum compounds include trialkyl aluminums such as trimethyl aluminum, triethyl aluminum and tributyl aluminum; trialkenyl aluminums such as triisoprenyl aluminum; dialkyl aluminum alkoxides such as diethyl-aluminum ethoxide and dibutyl aluminum ethoxide; alkyl aluminum sesquialkoxides such as ethyl aluminum sesquiethoxide and butyl aluminum sesqui-butoxide; partially alkoxylated alkyl aluminums having an average composition represented by the general formula $R^1{}_{2.5}Al(OR^2)_{0.5}$; partially halogenated alkyl aluminums, for example, alkyl aluminum dihalides such as ethyl aluminum dichloride, propyl aluminum dichloride and butyl aluminum dibromide; partially hydrogenated alkyl aluminums, for example, alkyl aluminum dihydrides such as ethyl aluminum dihydride and propyl aluminum dihydride; and partially alkoxylated and halogenated alkyl aluminums such as ethyl aluminum ethoxychloride, butyl aluminum butoxychloride, and ethyl aluminum ethoxybromide.

Electron donors are present with the metal components described above in forming the catalyst suitable for producing the base-polypropylenes described herein. Both "internal" and "external" electron donors are desirable for forming the catalyst suitable for making the base-polypropylene described herein. More particularly, the internal electron donor may be used in the formation reaction of the catalyst as the transition metal halide is reacted with the metal hydride or metal alkyl. Examples of suitable internal electron donors include amines, amides, ethers, esters, ketones, nitriles, phosphines, stilbenes, arsines, phosphoramides, thioethers, thioesters, aldehydes, alcoholates, and salts of organic acids.

More preferably, the internal donor is non-aromatic. The non-aromatic internal electron donor may comprise an aliphatic amine, amide, ester, ether, ketone, nitrile, phosphine, phosphoramide, thioethers, thioester, aldehyde, alcoholate, carboxylic acid, or a combination thereof.

Even more preferably, the non-aromatic internal electron donor comprises a $C_1$ to $C_{20}$ diester of a substituted or unsubstituted $C_2$ to $C_{10}$ dicarboxylic acid. The non-aromatic internal electron donor may be a succinate according to formula (IV):

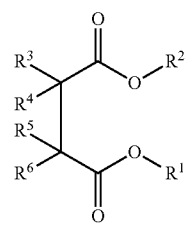

wherein $R^1$ and $R^2$ are independently $C_1$ to $C_{20}$ linear or branched alkyl, alkenyl, or cycloalkyl hydrocarbyl radicals;

$R^3$ to $R^6$ are independently, hydrogen, halogen, or $C_1$ to $C_{20}$ linear or branched alkyl, alkenyl, or cycloalkyl hydrocarbyl radicals, wherein the $R^3$ to $R^6$ radicals are not joined together, wherein at least two of the $R^3$ to $R^6$ radicals are joined to form a cyclic divalent radical, or a combination thereof.

The $R^3$ to $R^5$ groups of formula (IV) may be hydrogen and $R^6$ may be a radical selected from the group consisting of a primary branched, secondary or tertiary alkyl, or cycloalkyl radical having from 3 to 20 carbon atoms.

The internal donor may be a monosubstituted non-aromatic succinate compound. Suitable examples include diethyl-secbutylsuccinate, diethylhexylsuccinate, diethyl-cyclopropylsuccinate, diethyl-trimethylsilylsuccinate, diethyl-methoxysuccinate, diethyl-cyclohexylsuccinate, diethyl-(cyclohexylmethyl) succinate, diethyl-t-butylsuccinate, diethyl-isobutylsuccinate, diethyl-isopropylsuccinate, diethyl-neopentylsuccinate, diethyl-isopentylsuccinate, diethyl-(1,1,1-trifluoro-2-propyl) succinate, diisobutyl-sec-butylsuccinate, diisobutylhexylsuccinate, diisobutyl-cyclopropylsuccinate, diisobutyl-trimethylsilylsuccinate, diisobutyl-methoxysuccinate, diisobutyl-cyclohexylsuccinate, diisobutyl-(cyclohexylmethyl) succinate, diisobutyl-t-butylsuccinate, diisobutyl-isobutylsuccinate, diisobutyl-isopropylsuccinate, diisobutyl-neopentylsuccinate, diisobutyl-isopentylsuccinate, diisobutyl-(1,1,1-trifluoro-2-propyl) succinate, dineopentyl-sec-butylsuccinate, dineopentyl hexylsuccinate, dineopentyl cyclopropylsuccinate, dineopentyl trimethylsilylsuccinate, dineopentyl methoxysuccinate, dineopentyl cyclohexylsuccinate, dineopentyl (cyclohexylmethyl) succinate, dineopentyl t-butylsuccinate, dineopentyl isobutylsuccinate, dineopentyl isopropylsuccinate, dineopentyl neopentylsuccinate, dineopentyl isopentylsuccinate, and/or dineopentyl (1,1,1-trifluoro-2-propyl) succinate.

The internal electron donor having a structure consistent with formula (IV) may comprise at least two radicals from $R^3$ to $R^6$, which are different from hydrogen and are selected from $C_1$ to $C_{20}$ linear or branched alkyl, alkenyl, and/or cycloalkyl hydrocarbyl groups, which may contain heteroatoms. Two radicals different from hydrogen may be linked to the same carbon atom. Suitable examples include 2,2-disubstituted succinates including diethyl-2,2-dimethylsuccinate, diethyl-2-ethyl-2-methylsuccinate, diethyl-2-(cyclohexylmethyl)-2-isobutylsuccinate, diethyl-2-cyclopentyl-2-n-propylsuccinate, diethyl-2,2-diisobutylsuccinate, diethyl-2-cyclohexyl-2-ethylsuccinate, diethyl-2-isopropyl-2-methylsuccinate, diethyl-2,2-diisopropyl-diethyl-2-isobutyl-2-ethylsuccinate, diethyl-2-(1,1,1-trifluoro-2-propyl)-2-methylsuccinate, diethyl-2-isopentyl-2-isobutylsuccinate, diisobutyl-2,2-dimethylsuccinate, diisobutyl-2-ethyl-2-methylsuccinate, diisobutyl-2-(cyclohexylmethyl)-2-isobutylsuccinate, diisobutyl-2-cyclopentyl-2-n-propylsuccinate, diisobutyl-2,2-diisobutylsuccinate, diisobutyl-2-cyclohexyl-2-ethylsuccinate, diisobutyl-2-isopropyl-2-methylsuccinate, diisobutyl-2-isobutyl-2-ethylsuccinate, diisobutyl-2-(1,1,1-trifluoro-2-propyl)-2-methylsuccinate, diisobutyl-2-isopentyl-2-isobutylsuccinate, diisobutyl-2,2-diisopropylsuccinate, dineopentyl-2,2-dimethylsuccinate, dineopentyl-2-ethyl-2-methylsuccinate, dineopentyl-2-(cyclohexylmethyl)-2-isobutylsuccinate, dineopentyl-2-cyclopentyl-2-n-propylsuccinate, dineopentyl-2,2-diisobutylsuccinate, dineopentyl-2-cyclohexyl-2-ethylsuccinate, dineopentyl-2-isopropyl-2-methylsuccinate, dineopentyl-2-isobutyl-2-ethylsuccinate, dineopentyl-2-(1,1,1-trifluoro-2-propyl)-2-methylsuccinate, dineopentyl 2,2-diisopropylsuccinate, and/or dineopentyl 2-isopentyl-2-isobutylsuccinate.

The at least two radicals different from hydrogen may be linked to different carbon atoms between $R^3$ and $R^6$ in formula (IV). Examples include $R^3$ and $R^5$ or $R^4$ and $R^6$. Suitable non-aromatic succinate compounds such as this include: diethyl-2,3-bis(trimethylsilyl) succinate, diethyl-2,2-sec-butyl-3-methylsuccinate, diethyl-2-(3,3,3-trifluoropropyl)-3-methylsuccinate, diethyl-2,3-bis(2-ethylbutyl) succinate, diethyl-2,3-diethyl-2-isopropylsuccinate, diethyl-2,3-diisopropyl-2-methylsuccinate, diethyl-2,3-dicyclohexyl-2-methylsuccinate, diethyl-2,3-diisopropylsuccinate, diethyl-2,3-bis(cyclohexylmethyl) succinate, diethyl-2,3-di-t-butylsuccinate, diethyl-2,3-diisobutylsuccinate, diethyl-2,3-dineopentylsuccinate, diethyl-2,3-diisopentylsuccinate, diethyl-2,3-(1-trifluoromethyl-ethyl) succinate, diethyl-2-isopropyl-3-isobutylsuccinate, diethyl-2-t-butyl-3-isopropylsuccinate, diethyl-2-isopropyl-3-cyclohexylsuccinate, diethyl-2-isopentyl-3-cyclohexylsuccinate, diethyl-2-cyclohexyl-3-cyclopentylsuccinate, diethyl-2,2,3,3-tetramethylsuccinate, diethyl-2,2,3,3-tetraethylsuccinate, diethyl-2,2,3,3-tetrapropylsuccinate, diethyl-2,3-diethyl-2,3-diisopropylsuccinate, diisobutyl-2,3-bis(trimethylsilyl) succinate, diisobutyl-2,2-sec-butyl-3-methylsuccinate, diisobutyl-2-(3,3,3-trifluoropropyl)-3-methylsuccinate, diisobutyl-2,3-bis(2-ethylbutyl) succinate, diisobutyl-2,3-diethyl-2 isopropylsuccinate, diisobutyl-2,3-diisopropyl-2-methylsuccinate, diisobutyl-2,3-dicyclohexyl-2-methylsuccinate, diisobutyl-2,3-diisopropylsuccinate, diisobutyl-2,3-bis (cyclohexylmethyl) succinate, diisobutyl-2,3-di-t-butylsuccinate, diisobutyl-2,3-diisobutylsuccinate, diisobutyl-2,3-dineopentylsuccinate, diisobutyl-2,3-diisopentylsuccinate, diisobutyl-2,3-(1,1,1-trifluoro-2-propyl) succinate, diisobutyl-2,3-n-propylsuccinate, diisobutyl-2-isopropyl-3-isobutylsuccinate, diisobutyl-2-terbutyl-3-isopropylsuccinate, diisobutyl-2-isopropyl-3-cyclohexylsuccinate, diisobutyl-2-isopentyl-3-cyclohexylsuccinate, diisobutyl-2-n-propyl-3-(cyclohexylmethyl) succinate, diisobutyl-2-cyclohexyl-3-cyclopentylsuccinate, diisobutyl-2,2,3,3-tetramethylsuccinate, diisobutyl-2,2,3,3-tetraethylsuccinate, diisobutyl-2,2,3,3-tetrapropylsuccinate, diisobutyl-2,3-diethyl-2,3-diisopropylsuccinate, dineopentyl-2,3-bis(trimethylsilyl) succinate, dineopentyl-2,2-di-sec-butyl-3-methylsuccinate, dineopentyl 2-(3,3,3-trifluoropropyl)-3-methylsuccinate, dineopentyl-2,3-bis(2-ethylbutyl) succinate, dineopentyl 2,3-diethyl-2-isopropylsuccinate, dineopentyl-2,3-diisopropyl-2-methylsuccinate, dineopentyl-2,3-dicyclohexyl-2-methylsuccinate, dineopentyl-2,3-diisopropylsuccinate, dineopentyl-2,3-bis(cyclohexylmethyl) succinate, dineopentyl-2,3-di-t-butylsuccinate, dineopentyl-2,3-diisobutylsuccinate, dineopentyl-2,3-dineopentylsuccinate, dineopentyl-2,3-diisopentylsuccinate, dineopentyl 2,3-(1,1,1-trifluoro-2propyl) succinate, dineopentyl-2,3-n-propylsuccinate, dineopentyl-2-isopropyl-3-isobutylsuccinate, dineopentyl-2-t-butyl-3-isopropylsuccinate, dineopentyl-2-isopropyl-3-cyclohexylsuccinate, dineopentyl-2-isopentyl-3-cyclohexylsuccinate, dineopentyl-2-n-propyl-3-(cyclohexylmethyl) succinate, dineopentyl 2-cyclohexyl-3-cyclopentylsuccinate, dineopentyl-2,2,3,3-tetramethylsuccinate, dineopentyl 2,2,3,3-tetraethylsuccinate, dineopentyl-2,2,3,3-tetrapropylsuccinate, and/or dineopentyl-2,3-diethyl-2,3-diisopropylsuccinate.

The electron donor according to formula (IV) may include two or four of the radicals $R^3$ to $R^6$ joined to the same carbon atom which are linked together to form a cyclic multivalent radical. Examples of suitable compounds include 1-(ethoxycarbonyl)-1-(ethoxyacetyl)-2,6-dimethylcyclohexane, 1-(ethoxycarbonyl)-1-(ethoxyacetyl)-2,5-dimethyl-cyclopentane, 1-(ethoxycarbonyl)-1-(ethoxyacetylmethyl)-2-methylcyclohexane, and/or 1-(ethoxycarbonyl)-1-(ethoxy (cyclohexyl) acetyl) cyclohexane.

Preferably, the internal electron donor may be selected from the group consisting of diethyl-2,3-diisopropylsuccinate, diisobutyl-2,3-diisopropylsuccinate, di-n-butyl-2,3-di isopropylsuccinate, diethyl-2,3-dicyclohexyl-2-methylsuccinate, diisobutyl-2,3-dicyclohexyl-2-methylsuccinate, diisobutyl-2,2-dimethylsuccinate, diethyl-2,2-dimethylsuccinate, diethyl-2-ethyl-2-methylsuccinate, diisobutyl-2-ethyl-2-methylsuccinate, diethyl-2-(cyclohexylmethyl)-3-ethyl-3-methylsuccinate, diisobutyl-2-(cyclohexylmethyl)-3-ethyl-3-methylsuccinate, and combinations thereof.

In conjunction with an internal donor, two or more external electron donors may also use in combination with a catalyst. External electron donors include, but are not limited to, organic silicon compounds, for example, tetraethoxysilane (TEOS), methylcyclohexyldimethoxysilane (MCMS), propyltriethoxysilane (PTES) and dicyclopentyldimethoxysilane (DCPMS). Internal and external-type electron donors are described, for example, in U.S. Pat. Nos. 4,535,068; 4,218,339; 4,395,360; 4,328,122; 4,473,660; 5,652,303; and 6,087,459. The external electron donors act to control stereoregularity, which affects the amount of isotactic versus atactic polymers produced in a given system. The more stereoregular isotactic polymer is more crystalline, which leads to a material with a higher flexural modulus. Highly crystalline, isotactic polymers also display lower MFRs, as a consequence of a reduced hydrogen response during polymerization. The stereoregulating capability and hydrogen response of a given external electron donor are directly and inversely related. For example, the DCPMS donor has a substantially lower hydrogen response than the PTES donor, but produces a significantly higher level of stereoregularity than PTES.

One or more of the external electron donors may comprise an organic silicon compound of the general formula (V):

$$R^1{}_nSi(OR^2)_{4-n} \qquad (V)$$

wherein $R^1$ and $R^2$ independently represent a hydrocarbyl radical and n is 1, 2, or 3.

Examples of the suitable organic silicon compounds include trimethylmethoxysilane, trimethylethoxysilane, dimethyldimethoxysilane, dimethylethoxysilane, dimethyldiethoxysilane, diiso-propyldiethoxysilane, t-butylmethyl-n-diethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldimethoxysilane, bisethylphenyldimethoxysilane, dicyclohexyldiethoxysilane, cyclohexylmethyl-dimethoxysilane, cyclohexylmethyldiethoxysilane, ethyltrimethoxysilane, ethyltriethoxysilane, vinyl-trimethoxysilane, methyltrimethoxysilane, n-propyltriethoxysilane, decyltrimethoxysilane, decyltriethoxysilane, phenyltrimethoxysilane, [gamma]-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, chlorotriethoxysilane, vinyltributoxysilane, cyclo-hexyltrimethoxysilane, cyclohexyltriethoxysilane, 2-norbornanetriethoxysilane, 2-norbornanemethyldimethoxysilane, ethyl silicate, butyl silicate, trimethyl-phenoxysilane, methylallyloxysilane, vinyltris (beta-methoxyethoxysilane), vinyltriacetoxysilane, and/or dimethyltetraethoxydisiloxane.

Suitable examples of the organic silicon compounds in which n is 0, 1, or 3 include trimethylmethoxysilane, trimethylethoxysilane, methyl-phenyldimethoxysilane, methyltrimethoxysilane, t-butyl-methyldimethoxysilane, t-butylmethyldiethoxysilane, t-amylmethyldimethoxysilane, phenylmethyldimethoxysilane, cyclohexylmethyldimethoxysilane, cyclohexylmethyldiethoxysilane, ethyltrimethoxysilane, ethyltriethoxysilane, vinyltriethoxysilane, methyltrimethoxysilane, methyltriethoxysilane, propyltrimethoxysilane, decyl-trimethoxysilane, decyltriethoxysilane, phenyltrimethoxysilane, propyltriethoxysilane, butyltriethoxysilane, phenyltriethoxysilane, vinyltrimethoxysilane, vinyltributoxysilane, cyclohexyltrimethoxysilane, 2-norbornanetrimethoxysilane, and/or 2-norbornanetriethoxysilane.

Preferably the external electron donors are selected from any one or more of methyltrimethoxysilane, ethyltrimethoxysilane, ethyltriethoxysilane, vinyltriethoxysilane, propyltrimethoxysilane, decyltrimethoxysilane, decyltriethoxysilane, propyltriethoxysilane, butyltriethoxysilane, phenyltriethoxysilane, vinyltrimethoxysilane, vinyltributoxysilane and/or cyclohexyltrimethoxysilane.

The above disclosed organic silicon compounds may be used such that a compound capable of being changed into such an organic silicon compound is added at the time of polymerizing or preliminarily polymerizing an olefin, and the organic silicon compound may be formed in situ during the polymerization or the preliminary polymerization of the olefin.

More particularly, the production of the base-polypropylene may include the use of two external electron donors. The two external electron donors may be selected from any of the external electron donors described herein. But in a particular embodiment, the first external electron donor has the formula $R^1{}_2Si(OR^2)_2$, wherein each $R^1$ is independently a hydrocarbyl radical comprising from 1 to 10 carbon atoms in which the carbon adjacent to the Si is a secondary or a tertiary carbon atom, and wherein each $R^2$ is independently a hydrocarbyl radical comprising from 1 to 10 carbon atoms; and the second external electron donor has the formula $R^3{}_nSi(OR^4)_{4-n}$, wherein each $R^3$ and $R^4$ are independently a hydrocarbyl radical comprising from 1 to 10 carbon atoms, and n is 1, 2, or 3; wherein the second external electron donor is different than the first external electron donor.

The first external electron donor and the second external electron donor may be selected from the group consisting of tetraethoxysilane, methylcyclohexyldimethoxysilane, propyltriethoxysilane, dicyclopentydimethoxysilane, and combinations thereof. The Ziegler-Natta catalyst system may comprise 2.5 mol % to less than 50 mol % of the first external electron donor and greater than 50 mol % of a second external electron donor based on total mol % of external electron donors.

The two external electron donors A and B may be selected such that the melt flow rate (MFR, ASTM D1238 2.16 kg, 230° C.) (A) of polypropylene obtained by polymerizing propylene and optional comonomers in the presence of the first external electron donor (A) in combination with the solid titanium catalyst component and the organoaluminum compound catalyst component and the MFR (B) of polypropylene obtained by polymerizing propylene and optional comonomers in the presence of the second external electron donor (B) under the same conditions as in the case of using the external electron donor (A) follow the relationship:

$$1.2 \leq \log [MFR(B)/MFR(A)] \leq 1.4.$$

The external electron donors to be used in the preparation of the electron donor catalyst component may be those electron donors which are used in preparing the solid titanium catalyst component. Preferably each of the external electron donors (A) and (B) may comprise organic silicon compounds.

A method to make a base-polypropylene in any embodiment comprises contacting propylene monomers (and/or comonomers) at propylene polymerization conditions such as described herein with a catalyst system to produce a base-polypropylene comprising at least 94.0, or 96.0, or 98.0, or 99.0, or 99.2, or 99.6, or 99.8 or 100 wt % propylene by weight of the base-polypropylene, an MWD greater than 5 (or as described herein) and a Melt Strength of at least 15 or 20 or 30 or 40 or 50 cN, or within a range of from 10 or 20 or 30 or 40 cN to 50 or 60 or 80 or 150 cN at 190° C. determined using an extensional rheometer at 190° C. (described further below), wherein the catalyst system preferably comprises a Ziegler-Natta catalyst comprising a non-aromatic internal electron donor; and first and second external electron donors comprising different organosilicon compounds. The first external electron donor may have the formula $R^1{}_2Si(OR^2)_2$, wherein each $R^1$ is independently a hydrocarbyl radical comprising from 1 to 10 carbon atoms in which the carbon adjacent to the Si is a secondary or a tertiary carbon atom, and wherein each $R^2$ is independently a hydrocarbyl radical comprising from 1 to 10 carbon atoms; and the second external electron donor has the formula $R^3{}_nSi(OR^4)_{4-n}$, wherein each $R^3$ and $R^4$ are independently a hydrocarbyl radical comprising from 1 to 10 carbon atoms, n is 1, 2, or 3, and the second external electron donor is different than the first external electron donor.

The polymerization process according to the instant disclosure may include contacting propylene and the catalyst system under polymerization conditions. The polymerization process may include a preliminary polymerization step. The preliminary polymerization may include utilizing the Ziegler-Natta catalyst system comprising the non-aromatic internal electron donor in combination with at least a portion of the organoaluminum co-catalyst wherein at least a portion of the external electron donors are present wherein the catalyst system is utilized in a higher concentration than utilized in the subsequent "main" polymerization process.

The concentration of the catalyst system in the preliminary polymerization may be from 0.01 to 200 millimoles, or more preferably from 0.05 to 100 millimoles, calculated as a titanium atom, per liter of an inert hydrocarbon medium. The organoaluminum co-catalyst may be present in an amount sufficient to produce from 0.1 to 500 g, or more preferably from 0.3 to 300 g, of a polymer per gram of the titanium catalyst present, and may be present at from 0.1 to 100 moles, or more preferably from 0.5 to 50 moles, per mole of the titanium atom present in the catalyst component.

The preliminary polymerization may be carried out under mild conditions in an inert hydrocarbon medium in which an olefin and the catalyst components are present. Examples of the inert hydrocarbon medium used include aliphatic hydrocarbons, such as propane, butane, pentane, hexane, heptane, octane, decane, dodecane and kerosene; alicyclic hydrocarbons, such as cyclopentane, cyclohexane and methylcyclopentane; aromatic hydrocarbons, such as benzene, toluene and xylene; halogenated hydrocarbons, such as ethylene chloride and chlorobenzene; and mixtures thereof. The olefin used in the preliminary polymerization may be the same as an olefin to be used in the main polymerization.

The reaction temperature for the preliminary polymerization may be a point at which the resulting preliminary polymerization does not dissolve substantially in the inert hydrocarbon medium, which may be from −20 to +100° C., or from −20 to +80° C., or from 0 to 40° C.

During the preliminary polymerization, a molecular weight controlling agent such as hydrogen may be used. The molecular weight controlling agent may desirably be used in such an amount that the polymer obtained by preliminary polymerization has properties consistent with the intended product. The preliminary polymerization may be carried out so that from 0.1 to 1000 g, or more preferably from 0.3 to 300 g, of a polymer forms per gram of the titanium catalyst.

The polymerization of the olefin may be carried out in the gaseous phase, the liquid phase, bulk phase, slurry phase, or any combination thereof. In particular, polymerization may be carried out by slurry polymerization wherein the inert hydrocarbon may be used as a reaction solvent, or an olefin liquid under the reaction conditions may be used as the solvent.

The polymerization process may include contacting the titanium catalyst component, the internal electron donor, the organoaluminum co-catalyst, and the two external electron donors with each other at the time of the main polymerization, before the main polymerization, for example, at the time of the preliminary polymerization, or a combination thereof. In contacting them before the main polymerization, any two or more of these components may be freely selected and contacted. Two or more of the components may be contacted individually or partly and then contacted with each other in total to produce the catalyst system.

The catalyst system components may be contacted with each other before the polymerization in an inert gaseous atmosphere, the individual catalyst components may be contacted with each other in an olefin atmosphere, or any combination thereof. Also, hydrogen may be used during the polymerization to control the molecular weight and other properties of the resulting polymer.

The polymerization conditions may include a polymerization temperature of 20 to 200° C., or more preferably from 50 to 180° C., and a pressure from atmospheric pressure up to 100 kg/cm$^2$, or more preferably from 2 to 50 kg/cm$^2$. The polymerization process according to the instant disclosure may be carried out batch-wise, semi-continuously, or continuously. The polymerization may be carried out in two or more stages, using two or more reactors under different reaction conditions, utilizing different internal electron donors, different external electron donors, and/or different catalyst systems.

The base-polypropylene according to the instant disclosure may be produced in a bulk continuous reactor. A catalyst system comprising a magnesium chloride supported titanium catalyst according to one or more embodiments of the instant disclosure is utilized. Catalyst preparation may be carried out continuously in situ by contacting the catalyst solids, triethylaluminum, and the external electron donor system under conditions known in the art to yield active, stereospecific catalyst for polymerization of propylene. The activated catalyst may then be continuously fed into a prepolymerization reactor where it was continuously polymerized in propylene to a productivity of approximately 100 to 400 g-polymer/g-cat. The prepolymerized catalyst may then be continuously fed into a bulk slurry reactor, and polymerization continued at, for instance, 70° C. to 80° C., for a residence time of 90 to 120 minutes. The reaction slurry (homopolymer granules in bulk propylene) may then be removed from the reactor and the polymer granules continuously separated from the liquid propylene. The polymer granules may then be separated from the unreacted monomer to produce a granular product for compounding and/or mechanical properties. Hydrogen may be used in the reactor to control the melt flow rate of the base-polypropylene.

In any case, the base-polypropylene has desirable properties as described herein. The melt flow rate (MFR) of the base-polypropylene in any embodiment is less than 15 or 10 or 8 or 6 or 4 g/10 min, or within a range of from 0.50 or 0.80 or 1.0 g/10 min to 2 or 4 or 8 or 10 or 15 g/10 min in any embodiment. In any embodiment the weight average molecular weight (Mw) of the base-polypropylene is within a range of from 100,000 or 150,000 or 200,000 or 250,000 g/mole to 500,000 or 550,000 or 600,000 or 800,000 g/mole. In any embodiment the base-polypropylene has a molecular weight distribution (MWD) of at least 5 or 6, or within a range of from 5 or 6 or 7 to 8 or 10 or 12 or 16. In any embodiment, the z-average molecular weight (Mz) of the desirable base-polypropylenes useful in the invention is within the range of from 800,000 or 1,000,000 or 1,100,000 g/mole to 1,300,000 or 1,400,000 or 1,500,000 or 1,800,000 or 2,000,000 g/mole, and the ratio of the z-average molecular weight and the weight average molecular weight (Mz/Mw) is greater than 2.8, or 2.9, or 3.0, or within a range of from 2.8 or 2.9 or 3.0 or 3.5 to 4.0 or 4.5 or 5.0, the values greater than 2.8 indicating a high-molecular weight tail.

Useful base-polypropylenes may have other desirable properties. In any embodiment, the base-polypropylene has a Tensile at Yield within a range of from 20 or 25 or 30 or 25 MPa to 40 or 45 or 50 or 55 or 80 MPa. In any embodiment, the base-polypropylene has a 1% Secant Flexural Modulus within a range of from 1800 or 1900 or 2000 MPa to 2100 or 2200 or 2400 or 2600 MPa. And as mentioned, in any embodiment the base-polypropylene has a Melt Strength of at least 15 or 20 or 30 or 40 or 50 cN, or within a range of from 10 or 20 or 30 or 40 cN to 50 or 60 or 80 or 150 cN at 190° C. These parameters are determined as described below.

Antioxidants and Scavengers

The base-polypropylene in any embodiment is preferably blended with hindered phenol and phosphorous-type antioxidants, and optionally at least one alkyl radical scavenger. "Hindered phenol" and "phosphorous-type" antioxidants ("primary" and "secondary" antioxidants) are well documented in the art, such as in Stricker et al. "New Stabilizer solutions for polyolefin film grades", in European TAPPI PLACE Conference, Rome, Italy, May 12-14 (2003) (Ciba Specialty Chemicals); EP 1 736 506 A1; US 2005/0043450; and US 2006/0128849. Desirably, the base-polypropylene described herein is blended with at least one hindered phenol and at least one phosphorous-type antioxidant, and most preferably, with an alkyl radical scavenger as well.

More particularly, hindered phenol antioxidants, or "primary" antioxidants, comprise in any embodiment compounds having the structure HO-Ph-R, wherein "Ph" is a phenyl group which may or may not be substituted with alkyl groups, and "R" can be any alkyl, ketone, or carboxylate containing group. A particularly preferred structure in any embodiment for the hindered phenol antioxidant is selected from structures (VI):

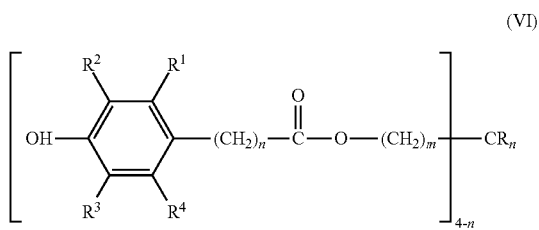

wherein each $R^1$ to $R^4$ is independently selected from hydrogens and $C_1$ to $C_{12}$ alkyls, more preferably, hydrogen and $C_4$ to $C_{10}$ alkyls, and most preferably hydrogen and $C_3$ to $C_8$ secondary or tertiary alkyls; and "n" is 0, 1, 2, or 3; n and m independently range from 1 to 5, or 10; and R is as defined for $R^1$. An example of such a phosphorous-type antioxidant is Irganox™ 1010 from BASF.

More particularly, phosphorous-type antioxidants, or "secondary" antioxidants, comprise in any embodiment compounds having the structure $P(OR)_3$, wherein each R is independently selected from hydrocarbyl groups, more particularly, a $C_5$ to $C_{20}$ alkyls, aryls, alkylaryls, and arylalkyls. A particularly preferred structure in any embodiment for the phosphorous-type antioxidant is selected from structures (VII):

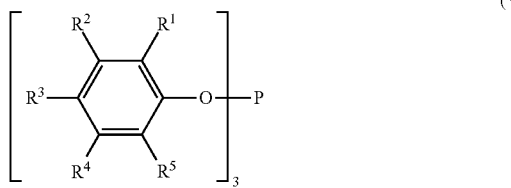

wherein each $R^1$ to $R^5$ is independently selected from hydrogens and $C_1$ to $C_{12}$ alkyls, more preferably, hydrogen and $C_4$ to $C_{10}$ alkyls, and most preferably hydrogen and $C_3$ to $C_8$ secondary or tertiary alkyls. An example of such a phosphorous-type antioxidant is Irgofos™ 168 from Ciba, Inc or BASF.

Preferably, these primary and secondary antioxidants are independently present in the inventive composition, or blend used in the inventive process, within a range from 500 or 600 or 700 or 800 ppm to 1000 or 1200 or 1600 or 2000 or 2500 or 3000 ppm relative to the total weight of the components.

The "alkyl radical scavenger" is a compound or combination of compounds selected from hydroxyl amine, hydroxyl amine-containing compounds, lactone, lactone-containing compounds, chromanol, and chromanol-containing compounds and capable of reacting with an alkyl radical compound to render it neutral (no radical centers present). More preferably, the alkyl radical scavenger is selected from 6-chromanol-containing compounds; most preferably, tocopherol and derivatives thereof (e.g., alpha, beta, gamma, delta, and $C_{10}$ to $C_{26}$ side chain).

Most preferably, the alkyl radical scavenger is selected from 6-chromanol-containing compounds. A highly desirable compound is selected from tocopherol and derivatives thereof (e.g., alpha, beta, gamma, delta, and $C_{10}$ to $C_{26}$ side chain). For example, desirable 6-chromanol-containing compounds can comprise compounds of formula (VIII):

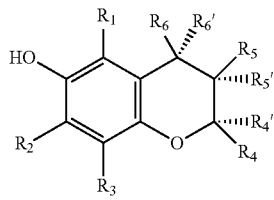

wherein each of $R_1$, $R_2$, $R_3$ and $R_6/R_{6'}$ are independently selected from hydrogen and $C_1$ to $C_{10}$ linear alkyls or branched alkyls, most preferably hydrogen and $C_1$ to $C_5$ linear and branched alkyls, and even more preferably, selected from hydrogen and methyl groups; and each of $R_4$ and $R_5$ (and $R_{4'}$ and $R_{5'}$) are independently selected from hydrogen and $C_1$ to $C_{30}$ linear or branched alkyls; even more preferably, either one of $R_4$ or $R_5$ (and $R_{4'}$ and $R_{5'}$) are independently selected from $C_8$ to $C_{24}$ branched alkyls, and most preferably either one of $R_4$ or $R_5$ (and $R_{4'}$ and $R_{5'}$) are independently selected from $C_{10}$ to $C_{20}$ branched alkyls, wherein the other of $R_4$ or $R_5$ is hydrogen. For instance, each of $R_1$, $R_2$ and $R_3$ may be methyl groups, while $R_5$ and $R_6$ are hydrogens, and $R_4$ is a branched $C_{14}$ to $C_{18}$ group, such as the case with α-tocopherol. The stereochemistry at the $R_4$ carbon is not important and can be a mixture of chiral centers.

The "branching" can be any alkyl group, preferably methyl groups, on at least one carbon along the main carbon chain.

The substitutions or branching on the longer $R_4$ and/or $R_5$ can be any alkyl group, preferably methyl groups, on at least one carbon along the main carbon chain. A most preferable alkyl radical scavenger is dl-α-tocopherol and its salts and $C_1$ to $C_3$ (any $R_1$ to $R_4$, and/or $R_6$ group) derivatives. A commercial example is Irganox™ E201 (3,4-dihydro-2,5,7, 8-tetramethyl-2-(4,8,12-trimethyltridecyl)-2H-1-benzopyran-6-ol, a tocopherol, or "vitamin E") from BASF. The alkyl radical scavenger is present in the inventive composition, or blend used in the inventive process, within a range from 5 or 20 or 50 or 100 ppm to 200 or 400 or 800 or 1000 or 2000 or 3000 or 4000 ppm relative to the total weight of the components.

The solid blend of primary antioxidant, secondary antioxidant, and alkyl radical scavenger may be further combined with acid scavengers such as calcium stearate and/or other fatty acid salts, zinc oxide, and/or a natural or synthetic hydrotalcite such as DHT-4A. Most preferably, the acid scavenger compound(s) are present within the range from 400, or 500 ppm to 1000, or 2000 ppm relative to the entire weight of the components.

The alkyl radical scavenger may be in the form of a liquid and/or solution. It may be desirable to add components to the base-polypropylene to be melt blended in solid form. Thus, in any embodiment, the alkyl radical scavenger is formed into a solid, either by mixing with an "inert" component such as another polymer (e.g., a polypropylene, polyethylene, or combination thereof), a filler such as talc or silica, or other ingredients such as the other antioxidants and/or acid scavengers described herein. Preferably the primary antioxidant, secondary antioxidant, and alkyl radical scavenger are formed into a solid pellet, pill, or powder and combined with the base-polypropylene in such a solid form. Thus in any embodiment at least two of any ingredients selected from the primary antioxidant, secondary antioxidant, alkyl radical scavenger, a polymer, and acid scavengers are formed into a solid, preferably before melt blending, and in any case, formed into a solid such as a powder or pill such that they can be added in that manner to the base-polypropylene before it is melt extruded. Thus, for example, the hindered-phenol compound or compounds can be formed into a solid with the alkyl radical scavenger, then combined with the base-polypropylene, adding the phosphorous-based antioxidant and/or acid scavenger separately. Alternatively, the hindered-phenol compound(s) and the phosphorous-based antioxidant can be combined with the alkyl radical scavenger to form a solid that can be added to the base-polypropylene, with or without the acid scavenger.

In any embodiment, the polypropylene compositions useful for melt blending comprise, or consist essentially of, or consist of, a blend of the base-polypropylene with at least one primary, at least one secondary antioxidant, at least one acid scavenger, and the alkyl radical scavenger. By "consist essentially of", what is meant is that the base-polypropylene may include these additives within the levels described herein as well as less than 4 wt %, or 2 wt %, or 1 wt %, or 0.5 wt % of another additive(s) (by weight of the composition as a whole) as is known in the art such as colorant, filler, nucleating agents, UV stabilizers, polymeric elastomer (e.g., EP rubber, EPDM, plastomers), LDPE, etc.

Method of Melt Blending

Preferably, the base-polypropylene is melt blended with the antioxidants and alkyl radical scavenger under conditions to preserve its Melt Strength. In particular, the process and/or additives are adjusted to preserve the Melt Strength by reducing the degradation of the polymer chains, in particular, the high molecular weight portion of the base-polypropylene. In a preferred embodiment, the inventive method includes combining the base-polypropylene, primary and secondary antioxidants in the amounts mentioned above, and alkyl radical scavenger in the amount mentioned above, together in any order and melt blending the components, desirable to form pellets of melt blended polypropylene. By "melt blend" what is meant is that the components are heated as by heating elements and/or shear forces such as in a single or twin screw extruder up to a desirable melt temperature. In any embodiment the solid and/or liquid components are mixed to form a dry blend and adding to a hopper attached to an extruder. Preferably, the antioxidants and alkyl radical scavenger are formed into a solid by blending, forming into a solid pellet, or other means. This solid may also include acid scavengers.

The blend is then fed into the extruder, such as a single or twin screw extruder, whereby the shear forces, with or without additional heating from the extruder barrel(s), form a melt of at least the polypropylene component of the blend, and possibly one or all of the other components. The ingredients are intimately mixed in the extruder while at least the polypropylene is in a molten state for some time until the molten material exits a die zone suitable for cutting pellets of melt blended polypropylene while the material is cooling.

In any embodiment, the invention includes melt blending the base-polypropylene and antioxidants in an extruder having a temperature-controlled length from the feed zone (where polymer enters the extruder, first 10% of the length of the extruder) to the die zone (where molten polymer exits the extruder, final 10% of the length of the extruder), wherein the initial melt temperature at the feed zone is less than 180° C. (or as described below), and the final melt temperature at the die zone of at least 210° C. (or as described below). In any embodiment the temperature of the polymer melt at the feed zone is preferably less than 180 or 175 or 170 or 165 or 160° C., or within a range from 160 or 165 or 170 or 175 or 180° C. to 190 or 200 or 205 or 210° C. In any embodiment the temperature of the polymer melt at the die zone is preferably at least 210, or 220 or 240° C., or within a range from 210, or 220 or 240° C. to 260 or 280 or 290 or 300° C. Preferably the extruder is provided with a cooling apparatus such as circulating water to regulate the temperature of the barrel, and most preferably that temperature can be independently controlled at the various stages. Also, a cooling liquid such as water may be used to cool the pellets and extract water-soluble materials from the melt or forming pellets.

Desirably, the back pressure on the extruder being used in melt blending is minimized. In any embodiment, a screen pack is absent from the extruder, or if present, is at least as course as 80 mesh, or 40 mesh. Also, the motor load on the extruder can be reduced to reduce the back pressure on the extruder.

In any embodiment, the properties of the base-polypropylene after such treatment is the same as the properties prior to treatment to within ±2, ±4, ±6, ±10, ±15, or ±20% of that measured property's original value (e.g., haze, clarity, tensile strength, modulus, melt flow rate, Melt Strength, etc.); that is, the measured properties of the melt blended polypropylene described herein are within these tolerances relative to the same measured property for the base-polypropylene.

Certain components may be melt blended with the base-polypropylene to form a primary masterbatch, then further blended with other ingredients to form the melt blended polypropylene of the invention. For example, the base-polypropylene can be melt blended with the primary and/or secondary antioxidants to form a masterbatch, which can then be later blended with a desired amount of the alkyl radical scavenger. Alternatively, a masterbatch can be formed of the base-polypropylene and alkyl radical scavenger, followed by later blending that masterbatch with primary and/or secondary antioxidants. The melt blending to make the masterbatch can take place at the same or different temperature used to form the final melt blended polypropylene.

Desirably, oxygen is excluded from the melt blending process such as by blanketing the feed zone used to feed to the extruder used to perform melt blending. Alternatively, oxygen may be excluded from the entire extruder. The exclusion of oxygen may be accomplished by any means such as by blanketing the desired part or parts of the extruder and/or attached equipment with an inert gas such as nitrogen, argon, or some combination thereof.

In any embodiment, free-radical forming compounds and/or organic peroxides are absent from the melt blended polypropylenes described herein, or in the alternative, are not added as a component in the melt blending process described herein (e.g., peroxydicarbonates, dibenzoyl peroxide, etc.).

In any case, the melt blending of the base-polypropylene to form the melt blended polypropylene may take place under a temperature gradient. In any embodiment at least the base-polypropylene used to form the melt blended polypropylene is melt blended through an apparatus such as an extruder having a length (i.e., from feed zone to die), wherein there is a temperature change along such length from the beginning stage of the extruder (first 10% of the length of the extruder) to the final stage of the extruder (last 10% of the length of the extruder) of at least 80, or 85, or 90, or 95° C., or within a range from 80, or 85, or 90° C. to 95, or 100, or 105, or 110 or 120° C. For example, at the entrance of the extruder the melt temperature of the molten polymer is within a range from 160° C. to 210° C., and the melt temperature of the molten polymer at the exit (die) of the extruder is within a range from 210° C. to 300° C.

Melt Blended Polypropylene

In any case, the resulting melt blended polypropylene composition is also an aspect of the invention(s) disclosed herein. Preferably, the melt blended polypropylene has a MFR (230° C./2.16 kg) of less than 15 g/10 min and a molecular weight distribution (Mw/Mn) within a range from 5 to 16, wherein the properties of the melt blended polypropylene are the same or substantially the same as prior to its being melt blended (the "base-polypropylene" used to form the melt blended polypropylene).

By "substantially the same" what is meant is that the properties of the base-polypropylene after such treatment is the same as the properties prior to treatment to within ±2, ±4, ±6, ±10, ±15, or ±20% of that measured property's original value; and more particularly, in any embodiment of the invention there is less than a 20% or 15% or 10% drop in the Melt Strength of the melt blended polypropylene relative to the base-polypropylene upon melt blending.

Preferably, the primary and secondary antioxidants as well as the alkyl radical scavenger are an intimate blend with the melt blended polypropylene, and are present at least during some point of the melt blending process. It is possible that some or all of any one or more of these components may react with such species as oxygen dissolved in and around the molten polymer and/or radical carbon species that may come from impurities in the system and/or the base-polypropylene itself. Thus, in any embodiment the invention includes a melt blended polypropylene comprising the base-polypropylene as described herein and further comprising (or consisting essentially of, or consisting of) the reaction product of at least one hindered phenol and at least one phosphorous-type antioxidants in the amounts disclosed herein, and within a range from 5 ppm to 4000 ppm of an alkyl radical scavenger, or other amounts as described herein, the reaction product being with one another, an oxygenate, a carbon radical, or combinations thereof. By "oxygenate" what is meant is oxygen and/or a hydrocarbon comprising one or more oxygen atoms; by "carbon radical" what is meant is any hydrocarbon or polymer chain that has at least one carbon-based radical. Most preferably, the alkyl radical scavenger and antioxidants prevent the base-polypropylene from reacting with any oxygenate or carbon radicals, thus leaving the base-polypropylene the same as before it was melt blended.

When referring to the "reaction product" what is meant is the product of the antioxidant and/or scavenger that has been exposed to temperatures and/or shear stress such that it chemically reacts with itself, other additives, carbon radicals, and/or oxygenates derived for example from oxygen that may be in and around the melt blend. The "reaction product" may also be referred to as a decomposition product. Desirably, the alkyl radical scavenger will react with carbon and/or oxygenate radicals as they form due to the high temperature and shear stress during melt blending and prevent those radicals from degrading the base-polypropylene and reducing its molecular weight, or otherwise altering the properties of the base-polypropylene. Thus, preferably the melt blending results in a reaction product of one or more of the primary antioxidant, secondary antioxidant, and alkyl radical scavenger but not the base-polypropylene.

However, it is possible that some amount of the base-polypropylene being melt blended, even in the presence of the antioxidants and scavengers, may react with radical species in the extruder. In this case, the invention includes the reaction product of (A) a base-polypropylene having a MFR (230° C./2.16 kg) of less than 15 g/10 min and a molecular weight distribution (Mw/Mn) of at least 5, and (B) independently, within a range from 500 ppm to 3000 ppm of at least one hindered phenol antioxidant, at least one phosphorous-type antioxidant, and (C) within a range from 5 ppm to 4000 ppm of an alkyl radical scavenger, to form a melt blended polypropylene. Preferably, the properties after melt blending are substantially the same as that measured property's original value prior to melt blending.

Thus, the melt blended polypropylene has similar properties as described for the base-polypropylene. The melt flow rate (MFR) of the melt blended polypropylene in any embodiment is less than 15 or 10 or 8 or 6 or 4 g/10 min, or within a range of from 0.50 or 0.80 or 1.0 g/10 min to 2 or 4 or 8 or 10 or 15 g/10 min in any embodiment. In any embodiment the weight average molecular weight (Mw) of the melt blended polypropylene is within a range of from 100,000 or 150,000 or 200,000 or 250,000 g/mole to 500,000 or 550,000 or 600,000 or 800,000 g/mole. In any embodiment the melt blended polypropylene has a molecular weight distribution (MWD) of at least 5 or 6, or within a range of from 5 or 6 or 7 to 8 or 10 or 12 or 16. In any embodiment, the z-average molecular weight (Mz) of the desirable melt blended polypropylenes useful in the invention is within the range of from 800,000 or 1,000,000 or 1,100,000 g/mole to 1,300,000 or 1,400,000 or 1,500,000 or 1,800,000 or 2,000,000 g/mole, and the ratio of the z-average molecular weight and the weight average molecular weight (Mz/Mw) is greater than 2.8, or 2.9, or 3.0, or within a range of from 2.8 or 2.9 or 3.0 or 3.5 to 4.0 or 4.5 or 5.0, the values greater than 2.8 indicating a high-molecular weight tail.

Useful melt blended polypropylenes may have other desirable properties. In any embodiment, the melt blended polypropylene has a Tensile at Yield within a range of from 20 or 25 or 30 or 25 MPa to 40 or 45 or 50 or 55 or 80 MPa. In any embodiment, the melt blended polypropylene has a 1% Secant Flexural Modulus within a range of from 1800 or 1900 or 2000 MPa to 2100 or 2200 or 2400 or 2600 MPa. In addition, the melt blended polypropylene in any embodiment has a Melt Strength of at least 15 or 20 or 30 or 40 or 50 cN, or within a range of from 10 or 20 or 30 or 40 cN to 50 or 60 or 80 or 150 cN at 190° C. These parameters are determined as described below. Preferably, these properties are within ±2, ±4, ±6, ±10, ±15, or ±20% of that measured property's original value prior to melt blending.

Desirably, as is demonstrated in the Examples, the method of the invention allows for melt blending at higher temperatures, such as about 210, or 220, or 240, or 250, or 260° C. and higher without degradation, preferably at the final or die zone of extrusion, or with only minimal degradation, of the base-polypropylene, meaning that as explained above the properties of the base-polypropylene do not change or only change a small amount upon melt extrusion. This is demonstrated in the data in Table 1, and graphically in FIG. 1, where it can be observed that when an exemplary alkyl radical scavenger, vitamin E, is added to the base-polypropylene along with primary and secondary antioxidants, the Melt Strength is comparable before melt blending ("base-polypropylene") and after ("melt blended polypropylene").

The melt blended polypropylene compositions have many uses and can be formed by processes such as foaming to form a foamed article, thermoformed, injection molded, blow molded, extrusion coated, or melt/spun bonded to form various articles.

The various descriptive elements and numerical ranges disclosed herein for the inventive methods and compositions can be combined with other descriptive elements and numerical ranges to describe the invention(s); further, for a given element, any upper numerical limit can be combined with any lower numerical limit described herein, including the examples in jurisdictions that allow such ranges. The features of the invention are demonstrated in the following non-limiting examples.

EXAMPLES

Polymer molecular weight (weight-average molecular weight, Mw, number-average molecular weight, Mn, and z-averaged molecular weight, Mz) and molecular weight distribution (Mw/Mn) are determined using Size-Exclusion Chromatography. Equipment consists of a High Temperature Size Exclusion Chromatograph (either from Waters Corporation or Polymer Laboratories), with a differential refractive index detector (DRI), an online light scattering detector, and a viscometer (SEC-DRI-LS-VIS). For purposes of the claims, the DRI detector shall be used. Three Polymer Laboratories PLgel 10 mm Mixed-B columns are used. The nominal flow rate is 0.5 cm$^3$/min and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of reagent grade 1,2,4-trichlorobenzene (TCB). The TCB mixture is then filtered through a 0.7 μm glass pre-filter and subsequently through a 0.1 μm Teflon filter. The TCB is then degassed with an online degasser before entering the SEC.

All formulations listed in Table 2 were compounded in a 30 mm Werner Pfleiderer twin screw extruder. The screw RPM was 160 and the typical output was 20 lbs/hr. The formulations were compounded at the target melt temperatures shown in Table 1 (485° F./252° C., 500° F./260° C. and 520° F./271° C.) with a nitrogen purge on the hopper. The barrel was fitted with a cooler to control the melt temperature of the polypropylene melt. The screen pack was either removed, or at least as course as 80 mesh.

The base-polypropylene selected was a homopolymer having a Melt Flow Rate of 1.0 g/10 min based on ASTM Method D 1238, Condition L (230° C., 2.16 kg). In particular, the base-polypropylene used in the exemplary formulations was a homopolymer of propylene-derived units and made using Avant™ ZN 168 M in conjunction with an external donor blend of propyltriethoxysilane and dicyclopentyldimethoxysilane as described in U.S. Pat. No. 6,087,459.

The 1.0 MFR base-polypropylene had a MWD of 2.8 (±0.2), a Tensile at Yield of 39 MPa (±1) (ASTM D638, with a crosshead speed of 50.8 mm/min (2.0 in/min), and a gauge length of 50.8 mm (2.0 in), using an Instron Machine), a 1% Secant Flexural Modulus of 2050 MPa (±15) (ASTM D790A, using a crosshead speed of 1.27 mm/min (0.05 in/min), and a support span of 50.8 mm (2.0 in) using an Instron machine), and a HDT of 125° C. (±1) (ASTM D648, load of 0.45 MPa (66 psi)). The MWD is calculated by GPC (DRI) as a stated above.

Also, the base-polypropylene had a Melt Strength of 50 cN (±2). For purposes herein, the "Melt Strength" of a polymer at a particular temperature, e.g., 190° C., was determined with a Gottfert Rheotens Melt Strength Apparatus (e.g., Gottfert Rheotens 71.97). The measurement was accomplished by grasping the extrudate from a capillary rheometer (e.g., a Gottfert Rheograph 2002 capillary rheometer), or from an extruder equipped with a capillary die, after the extrudate has been extruded 100 mm using variable speed gears and increasing the gear speed at a constant acceleration (12 mm/s$^2$, starting from an initial, zero-force calibration velocity of 10 mm/s) until the molten polymer strand breaks. The force in the strand was measured with a balance beam in conjunction with a linear variable displacement transducer. The force required to extend and then break the extrudate is defined as the Melt Strength. The force was measured in centinewtons (cN). A typical plot of force as a function of wheel velocity is known in the art to include a "resonate" immediately before the strand breaks. In such cases, the plateau force was approximated by the midline between the oscillations.

The granules of base-polypropylene used in the examples were combined with 500 ppm level of Irganox™ 1010 prior to compounding (melt extrusion examples). During melt extrusion, the additives in Table 2 were additionally used. Weight percentages and/or ppm values are relative to the total weight of the components (polypropylene and additives). Also added in the form of solids was 500 ppm each of calcium stearate and DHT-4A. Each of the Irganox™ and Irgafos™ antioxidants mentioned in Table 2 were purchased from BASF. The Revonox™ 501 was purchased from Chitec Technology Co., Ltd. Finally, the Genox™ EP was purchased from Addivant. "Actual" melt temperatures are those measured during compounding/extrusion of the samples in Table 2 performed by thermocouple temperature probes at the last 10% of the length of the extruder near the die.

The primary antioxidant, secondary antioxidant, alkyl radical scavenger, and two acid scavengers were formed into a solid pellet and added to the extruder with the base-polypropylene.

Figure 2:
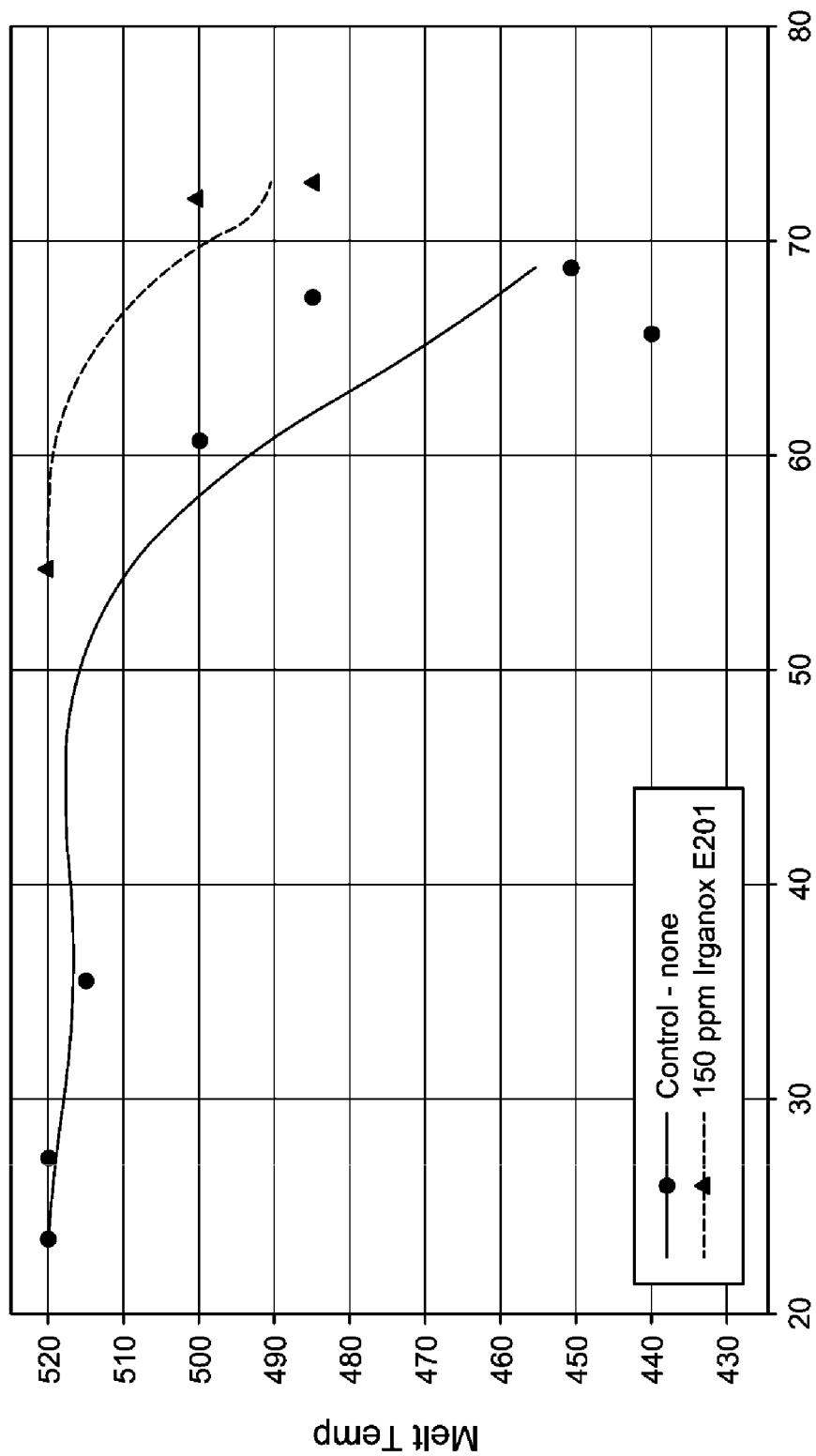
FIG. 2 is a graphical plot of one of the same control and inventive examples in Table 2 of melt temperature (temperature of the melt) as a function of Melt Strength.

FIGS. 1 and 2 show graphically the improvement in Melt Strength upon melt extrusion of inventive polypropylene formulations. In particular, it can be seen that when Irganox 201 (vitamin E) is present with the base-polypropylene upon melt blending, along with the primary and secondary antioxidants, the resultant melt blended polypropylene has a Melt Strength value at or near the value it was before melt blending. At 500° F. (260° C.), the overall Melt Strength is higher than when melt blending takes place at 520° F. (271° C.), one can see that the large drop in Melt Strength at 520° F. (271° C.) is minimized by the invention.

Examples of other desirable base-polypropylenes are found in Table 3, wherein each row represents a different embodiment of the useful "base-polypropylene" as described herein.

TABLE 1

Exemplary Conditions of Compounding PP with Additives in Table 2

| Temperature Set points | ° F. | ° C. |
|---|---|---|
| Feed Zone | 350 | 177 |
| Zone 1 & 2 | 360 | 182 |
| Zone 3 | 370 | 188 |
| Zone 4 & 5 | 380 | 193 |
| Die (Die Zone) | 400 | 204 |
| Measured Melt Temperature at or near the die | See Table 2 | See Table 2 |
| Screw RPM | 160 | 160 |
| Typical Output, lbs/hr | 20 lb/hr | 9.1 kg/hr |

TABLE 2

PP Compounded with Antioxidants and C-Centered Radical Scavengers

| Sample ID | Phenolic A/O Irganox 1010 (ppm) | Phosphite A/O Irgafos 168 (ppm) | C-Centered Radical Scavenger (AO Booster) | | | Calcium stearate (ppm) | Target Melt Temperature ° F. (° C.) | Actual Melt Temperature ° F. (° C.) | Rheotens Melt Strength @190 C. (cN) |
| | | | Irganox E 201 (Vitamin E) (ppm) | Revonox 501 (Lactone) (ppm) | Genox EP (hydroxylamine) (ppm) | | | | |
|---|---|---|---|---|---|---|---|---|---|
| 1-a | 1900 | 2000 | — | — | — | 500 | 485 (252) | 486 (252) | 67.4 |
| 1-b | 1900 | 2000 | — | — | — | 500 | 500 (260) | 501 (260) | 60.8 |
| 1-c | 1900 | 2000 | — | — | — | 500 | 520 (271) | 521 (271) | 27.2 |
| 2-a | 1900 | 2000 | 150 | — | — | 500 | 485 (252) | 485 (252) | 72.8 |
| 2-b | 1900 | 2000 | 150 | — | — | 500 | 500 (260) | 501 (260) | 72.1 |
| 2-c | 1900 | 2000 | 150 | — | — | 500 | 520 (271) | 520 (271) | 54.8 |
| 3-a | 1900 | 2000 | 300 | — | — | 500 | 485 (252) | 485 (252) | 74.2 |
| 3-b | 1900 | 2000 | 300 | — | — | 500 | 500 (260) | 499 (259) | 68.9 |
| 3-c | 1900 | 2000 | 300 | — | — | 500 | 520 (271) | 521 (271) | 52.0 |
| 4-a | 1900 | 2000 | — | 150 | — | 500 | 485 (252) | 485 (252) | 74.0 |
| 4-b | 1900 | 2000 | — | 150 | — | 500 | 500 (260) | 500 (260) | 65.0 |
| 4-c | 1900 | 2000 | — | 150 | — | 500 | 520 (271) | 519 (271) | 37.4 |
| 5-a | 1900 | 2000 | — | — | 1000 | 500 | 485 (252) | 486 (252) | 22.3 |
| 5-b | 1900 | 2000 | — | — | 1000 | 500 | 500 (260) | 499 (259) | 16.9 |
| 5-c | 1900 | 2000 | — | — | 1000 | 500 | 520 (271) | 520 (271) | 10.3 |

TABLE 3

Properties of Desirable Polypropylenes Useful in the Invention

| $I_2$ (g/10 min) | MS (cN) | Mn | Mw | Mz | Mw/Mn | Mz/Mw |
|---|---|---|---|---|---|---|
| 1.9 | 20.5 | 39,408 | 349,553 | 1,054,980 | 8.87 | 3.02 |
| 1.9 | 15.7 | 37,761 | 369,305 | 1,224,945 | 9.78 | 3.32 |
| 1.4 | 21.9 | 42,084 | 415,998 | 1,549,315 | 9.88 | 3.72 |
| 1.5 | 24.1 | 64,736 | 402,948 | 1,185,285 | 6.22 | 2.94 |
| 1.9 | 19.8 | 53,051 | 383,417 | 1,204,866 | 7.23 | 3.14 |
| 1.8 | 15.6 | 65,099 | 441,627 | 1,567,715 | 6.78 | 3.55 |
| 1.9 | 15.9 | 40,986 | 412,247 | 1,500,753 | 10.06 | 3.64 |
| 1.8 | 21.7 | 64,008 | 446,154 | 1,635,636 | 6.97 | 3.67 |
| 1.8 | 15.9 | 43,658 | 435,706 | 1,639,862 | 9.98 | 3.76 |
| 1.9 | 16 | 52,317 | 425,363 | 1,480,536 | 8.13 | 3.48 |
| 1.9 | 15.5 | 54,875 | 412,965 | 1,496,596 | 7.53 | 3.62 |

Having described the various aspects of the inventive methods and compositions, described here in numbered paragraphs is:

P1. A melt blended polypropylene comprising (or consisting of, or consisting essentially of) (A) a base-polypropylene having a MFR (230° C./2.16 kg) of less than 15 g/10 min and a molecular weight distribution (Mw/Mn) of at least 5, and (B) the reaction product of (i) at least one hindered phenol antioxidant, (ii) at least one phosphorous-type antioxidant, and (iii) within the range from 5 ppm to 4000 ppm of an alkyl radical scavenger, and (iv) an oxygenate, a carbon radical, or combinations thereof P2. A melt blended polypropylene comprising the reaction product of (A) a base-polypropylene having a MFR (230° C./2.16 kg) of less than 15 g/10 min and a molecular weight distribution (Mw/Mn) of at least 5, with (B) at least one hindered phenol antioxidant, (C) at least one phosphorous-type antioxidant, (D) within a range from 5 ppm to 4000 ppm of an alkyl radical scavenger, and (E) an oxygenate, a carbon radical, or combinations thereof P3. A method of melt blending a polypropylene composition to form the melt blended polypropylene of numbered paragraph 1 or 2, comprising (or consisting of, or consisting essentially of): providing (A) a base-polypropylene having a melt flow rate (ASTM D1238, condition L at 230° C. and 2.16 kg load) of less than 15 g/10 min and a molecular weight distribution (Mw/Mn) of at least 5, and (B) at least one hindered phenol antioxidant and at least one phosphorous-type antioxidant, and within the range from 5 ppm to 4000 ppm of an alkyl radical scavenger; melt blending the base-polypropylene, antioxidants and alkyl radical scavenger in an extruder having a temperature controlled length from the feed zone to the die zone, wherein the initial melt temperature at the feed zone is less than 180° C., and the final melt temperature at the die zone of at least 210° C.; and isolating a melt blended polypropylene.

P4. The method of numbered paragraph 3, wherein the melt blending takes place under an inert atmosphere, most preferably at least the hopper is under an inert atmosphere.

P5. The method of any one of numbered paragraphs 3-4, wherein the hindered phenol, phosphorous-type antioxidant, and alkyl radical scavenger are provided and combined with the base-polypropylene in the form of a solid.

P6. The method of any one of numbered paragraphs 3-5, wherein the base-polypropylene is first melt blended with the hindered phenol antioxidant, phosphorous-type antioxidant, or both, to form a masterbatch, followed by melt blending with the alkyl radical scavenger.

P7. The method of any one of numbered paragraphs 3-6, wherein a screen pack is absent from the extruder, or if present, is at least as course as 80 mesh.

P8. The method of any one of numbered paragraphs 3-7, wherein the melt blended polypropylene has a Melt Strength of at least 15 cN.

P9. The method of any one of numbered paragraphs 3-8, wherein the Melt Strength of the melt blended polypropylene within 20% less than the Melt Strength of the base-polypropylene.

P10. The method of any one of numbered paragraphs 3-9, wherein the melt blended polypropylene has a Mz/Mw value of greater than 2.8.

P11. The method of any one of numbered paragraphs 3-10, wherein the measured properties of the melt blended polypropylene are within ±20% of that measured property's value for the base-polypropylene.

P12. The method of any one of numbered paragraphs 3-11, wherein the alkyl radical scavenger is selected from hydroxyl amine, hydroxyl amine-containing compounds, lactone, lactone-containing compounds, chromanol, and chromanol-containing compounds.

P13. The method of any one of numbered paragraphs 3-12, wherein the alkyl radical scavenger is selected from 6-chromanol-containing compounds.

P14. The method of any one of numbered paragraphs 3-13, wherein the alkyl radical scavenger is a 6-chromanol-containing compounds selected from the group consisting of compounds of formula:

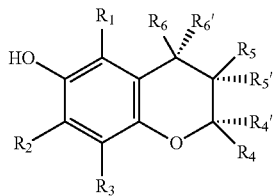

wherein each of $R_1$, $R_2$, $R_3$ and $R_6$ are independently selected from hydrogen and C1 to C10 linear alkyls or branched alkyls; and each of $R_4$ and $R_5$ (and $R_{4'}$ and $R_{5'}$) are independently selected from hydrogen and C1 to C30 linear or branched alkyls.

P15. The method of any one of numbered paragraphs 3-14, wherein the hindered phenol and phosphorous-type antioxidants are independently present within a range from 500 ppm to 3000 ppm.

P16. The method of any one of numbered paragraphs 3-15, wherein the base-polypropylene is first melt blended with the hindered phenol antioxidant, phosphorous-type antioxidant, or both, to form a masterbatch, followed by melt blending with the alkyl radical scavenger.

P17. The method of any one of numbered paragraphs 3-16, wherein at least the base-polypropylene used to form the melt blended polypropylene is melt blended through an apparatus such as an extruder having a length, wherein there is a temperature change along such length from the entrance of the extruder (e.g., feed zone) to the exit (e.g., die) of the extruder of at least 80° C.

P18. The method of any one of numbered paragraphs 3-17, wherein the melt blended polypropylene is foamed, thermoformed, injection molded, blow molded, extrusion coated, or melt/spun bonded.

P19. The method of any one of numbered paragraphs 3-18, wherein the alkyl radical scavenger is formed into a solid by blending with at least one other ingredient.

P20. The method of any one of numbered paragraphs 3-19, wherein at least two any ingredients selected from the primary antioxidant, secondary antioxidant, alkyl radical scavenger, a polymer, and acid scavengers are formed into a solid before melt blending.

Also disclosed is the use of hindered phenol and phosphorous-type antioxidants, and within the range from 5 ppm to 4000 ppm of an alkyl radical scavenger relative to the total weight of the components to form a polypropylene composition suitable for melt blending as described above to form a melt blended polypropylene.

The phrase "consisting essentially of" means that no other additives (antioxidants, antistatic agents, anti-slip agents, anti-blocking agents, peroxides, cross-linkers, fillers) are present in the composition being referred to other than those named, or, if present, are present to a level no greater than 0.5, or 1.0, or 2.0, or 4.0 wt % by weight of the composition; and in a process, "consisting essentially of" means that no other major process step is present or effects the claimed composition properties such that the value would be outside the claim scope.

For all jurisdictions in which the doctrine of "incorporation by reference" applies, all of the test methods, patent publications, patents and reference articles are hereby incorporated by reference either in their entirety or for the relevant portion for which they are referenced, including the priority document(s).

The invention claimed is:

1. A method of melt blending a polypropylene composition, comprising:
   providing (A) a base-polypropylene having a melt flow rate according to ASTM D1238, condition L, of less than 15 g/10 min, a molecular weight distribution (Mw/Mn) of 6 to 16, and a ratio of a z-average molecular weight and a weight average molecular weight (Mz/Mw) within a range of 2.8 and 5.0, (B) at least one hindered phenol antioxidant and at least one phosphorous-type antioxidant, and (C) within the range from 5 ppm to 4000 ppm of an alkyl radical scavenger and within the range from 1000 ppm to 2000 ppm of an acid scavenger relative to the total weight of the components, wherein the acid scavenger is formulated as a solid, and wherein the at least one hindered phenol antioxidant, the at least one phosphorous-type antioxidant, and the alkyl radical scavenger are mixed and formed into one or more solid pellets,
   wherein the alkyl radical scavenger comprises one or more 6-chromanol-containing compounds selected from the group consisting of compounds of formula:

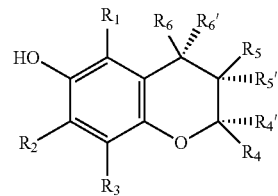

wherein each of $R_1$, $R_2$, $R_3$, $R_6'$ and $R_6$ are independently selected from hydrogen and $C_1$ to $C_{10}$ linear alkyls or branched alkyls, and wherein each of $R_4$, $R_5$, $R_4'$, and $R_5'$ are independently selected from hydrogen and $C_1$ to $C_{30}$ linear or branched alkyls;

melt blending the base-polypropylene, the acid scavenger, and the one or more solid pellets in an extruder having a temperature controlled length from the feed zone to the die zone, wherein the initial melt temperature at the feed zone is less than 180° C., wherein the final melt temperature at the die zone of at least 210° C., and wherein oxygen is excluded from at least the feed zone during the melt blending; and isolating a melt blended polypropylene, wherein the melt blended polypropylene has a Tensile at Yield within a range of 45 MPa to 80 MPa.

2. The method of claim 1, wherein the alkyl radical scavenger is present within the range from 20 ppm to 3000 ppm relative to the total weight of the components.

3. The method of claim 1, wherein a screen pack is absent from the extruder, or if present, is at least as course as 80 mesh.

4. The method of claim 1, wherein the base-polypropylene has a melt strength of at least 15 cN at 190° C.

5. The method of claim 1, wherein at 260° C. there is less than a 20% drop in the melt strength of the melt blended polypropylene relative to the base-polypropylene.

6. The method of claim 1, wherein the properties of the melt blended polypropylene are within ±20% of that measured property's original value prior to melt blending for the base-polypropylene.

7. The method of claim 1, wherein the hindered phenol and phosphorous-type antioxidants are independently present within a range from 500 ppm to 3000 ppm.

8. The method of claim 1, wherein at least the base-polypropylene used to form the melt blended polypropylene is melt blended through an apparatus having a length, wherein there is a temperature change along such length from the entrance of the extruder to the exit of the extruder of at least 80° C.

9. The method of claim 1, wherein the melt blended polypropylene is foamed, thermoformed, injection molded, blow molded, extrusion coated, or melt/spun bonded to form articles.

10. The method of claim 1, wherein the Tensile at Yield of the melt blended polypropylene is within a range of 50 MPa to 80 MPa.

11. The method of claim 1, wherein the hindered phenol and phosphorous-type antioxidants are independently present within a range from 800 ppm to 3000 ppm.

* * * * *